United States Patent
Quan et al.

(10) Patent No.: US 10,057,827 B2
(45) Date of Patent: Aug. 21, 2018

(54) INFORMATION SENDING AND RECEIVING METHODS AND APPARATUSES, AND INFORMATION TRANSMISSION SYSTEM

(71) Applicant: Huawei Technologies Co., Ltd., Shenzhen, Guangdong (CN)

(72) Inventors: Wei Quan, Beijing (CN); Jian Zhang, Beijing (CN); Zhenxing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 14/959,715

(22) Filed: Dec. 4, 2015

(65) Prior Publication Data
US 2016/0088541 A1    Mar. 24, 2016

Related U.S. Application Data

(63) Continuation of application No. PCT/CN2013/076797, filed on Jun. 5, 2013.

(51) Int. Cl.
| | |
|---|---|
| H04W 36/14 | (2009.01) |
| H04B 7/022 | (2017.01) |
| H04B 7/024 | (2017.01) |
| H04W 72/04 | (2009.01) |

(52) U.S. Cl.
CPC ............ H04W 36/14 (2013.01); H04B 7/022 (2013.01); H04B 7/024 (2013.01); H04W 72/042 (2013.01); H04W 72/0466 (2013.01)

(58) Field of Classification Search
CPC ............................ H04W 36/14; H04W 72/042
See application file for complete search history.

(56) References Cited

U.S. PATENT DOCUMENTS

2008/0311926 A1* 12/2008 Fischer ............... H04W 72/005
  455/452.1
2009/0122839 A1*  5/2009 Luo .................... H04B 1/70735
  375/145

(Continued)

FOREIGN PATENT DOCUMENTS

| CN | 1738473 A | 2/2006 |
|---|---|---|
| CN | 101415254 A | 4/2009 |

(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 V11.4.0, Mar. 2013, 3GPP TS 36.423 V11.4.0, Mar. 2013, 144 pages.

(Continued)

*Primary Examiner* — Zhiren Qin

(57) ABSTRACT

Information sending and receiving methods and apparatuses, and an information transmission system are disclosed, which are used to resolve a problem in the prior art that cell-edge UE cannot accurately receive information sent by eNBs. The method includes: acquiring, by at least two eNBs, information to be delivered to UE; scrambling, by using a same scrambling code, the information to be delivered to the UE; and delivering scrambled information to the UE at a same moment.

14 Claims, 5 Drawing Sheets

(56) References Cited

U.S. PATENT DOCUMENTS

| | | | |
|---|---|---|---|
| 2010/0034161 A1* | 2/2010 | Luo | H04B 1/707 370/329 |
| 2010/0284319 A1* | 11/2010 | Wang | H04W 72/005 370/312 |
| 2011/0199954 A1* | 8/2011 | Shindo | H04W 72/005 370/312 |
| 2012/0039318 A1 | 2/2012 | Zukawa | |
| 2014/0016598 A1* | 1/2014 | Kwon | H04L 5/0023 370/329 |
| 2014/0233538 A1* | 8/2014 | Zhang | H04W 72/1205 370/336 |
| 2015/0208282 A1* | 7/2015 | Grant | H04W 36/18 370/331 |

FOREIGN PATENT DOCUMENTS

| | | |
|---|---|---|
| CN | 101511113 A | 8/2009 |
| EP | 2 040 430 A1 | 3/2009 |
| WO | WO 2010/084874 A1 | 7/2010 |

OTHER PUBLICATIONS

"3rd Generation Partnership Project; Technical Specification Group Radio Access Network; Evolved Universal Terrestrial Radio Access Network (E-UTRAN); Physical layer procedures (Release 11)" 3GPP Ts 36.213 V11.2.0, Feb. 2013, 173 pages.

"3rd Generation Partnership Project; Technical Specification Group Radio Access Network; Evolved Universal Terrestrial Radio Access Network (E-UTRAN); S1 Application Protocol (S1AP)(Release 11)", 3GPP TS 36.413 V11.3.0, Mar. 2013, 274 pages.

"3rd Generation Partnership Project; Technical Specification Group Radio Access Network; Evolved Universal Terrestrial Radio Access Network (E-UTRA); Radio Resource Control (RRC); Protocol specification (Release 11)", 3GPP TS 36.331 V11.3.0, Mar. 2013, 344 pages.

* cited by examiner

INFORMATION SENDING AND RECEIVING METHODS AND APPARATUSES, AND INFORMATION TRANSMISSION SYSTEM

CROSS-REFERENCE TO RELATED APPLICATIONS

This application is a continuation of International Application No. PCT/CN2013/076797, filed on Jun. 5, 2013, which is hereby incorporated by reference in its entirety.

TECHNICAL FIELD

The present invention relates to the field of communications technologies, and in particular, to information sending and receiving methods and apparatuses, and an information transmission system.

BACKGROUND

Currently, in a wireless communications system, information generally needs to be frequently sent and received between a base station (evolved NodeB, eNB) and user equipment (UE).

For example, when UE is called, each eNB in a tracking area (TA) in which the UE is located needs to broadcast a paging message carrying an identifier of the UE, and after receiving the paging message carrying the identifier of the UE, the UE returns a paging response, and establishes a session connection; or, when system information of a cell (including a frequency, an access resource, and the like of the cell) is changed, an eNB of the cell needs to broadcast a paging message carrying updated system information of the cell, and after receiving the paging message, the UE correspondingly updates system information, which is stored by the UE, of the cell. If system messages of multiple cells are changed, eNBs of the multiple cells all need to broadcast paging messages carrying updated system information of the cells; or each eNB in the TA broadcasts paging information carrying earthquake and tsunami warning system (ETWS) information, and after receiving the paging message, the UE reads the ETWS information carried in the paging message.

For another example, when UE is handed over from a source cell to a target cell, the UE first reports a measurement report to a source cell eNB (the source cell eNB is referred to as an SeNB below); the SeNB performs handover determining according to the measurement report reported by the UE, and sends a handover preparation request message to a target cell eNB (the target cell eNB is referred to as a TeNB below); then, the TeNB sends a handover preparation acknowledgment message to the SeNB, where the message carries a handover command; finally, the SeNB delivers the handover command to the UE, and after receiving the handover command, the UE is handed over to the target cell.

However, in the prior art, when eNBs send information to UE, the information is generally sent separately. Even if all eNBs in one TA broadcast paging messages as described in the foregoing example, scrambling codes based on which the eNBs broadcast the paging messages are different, and therefore, the UE can receive, at a time, a paging message broadcast by only one eNB; therefore, due to a reduction in signal strength and quality, cell-edge UE cannot accurately receive information sent by eNBs.

Specifically, if called UE cannot accurately receive a paging message, an access delay is prolonged. If the UE cannot accurately receive a paging message that is delivered because system information is updated, it is caused that the UE cannot normally camp on a cell whose system information is updated. If the UE cannot accurately receive a paging message that is delivered because of ETWS information, a catastrophic loss may be caused. If the UE cannot accurately receive a handover command that is delivered because of a cell handover, it is caused that the UE cannot be normally handed over to a target cell.

SUMMARY

Embodiments of the present invention provide information sending and receiving methods and apparatuses, and an information transmission system, which are used to resolve a problem in the prior art that cell-edge UE cannot accurately receive information sent by eNBs.

According to a first aspect, an information sending method is provided, including:

acquiring, by at least two base stations eNBs, information to be delivered to user equipment UE;

scrambling, by using a same scrambling code, the information to be delivered to the UE; and delivering scrambled information to the UE at a same moment.

With reference to the first aspect, in a first possible implementation manner, when the information to be delivered to the UE is paging messages, before the scrambling, by the at least two eNBs by using a same scrambling code, the information to be delivered to the UE, the method further includes:

receiving, by the at least two eNBs, configuration information sent by a network management entity, wherein the configuration information carries information about a first scrambling code and parameter information that is used to determine a sending moment for sending the paging messages;

the scrambling, by using a same scrambling code, the information to be delivered to the UE specifically includes:

scrambling, by the at least two eNBs, the paging messages by using the first scrambling code carried in the received configuration information; and the delivering scrambled information to the UE at a same moment specifically includes:

determining, by the at least two eNBs according to the parameter information carried in the configuration information, the sending moment for sending the paging messages, and delivering scrambled paging messages to the UE at the determined sending moment.

With reference to the first possible implementation manner, in a second possible implementation manner, before the delivering scrambled information to the UE at a same moment, the method further includes:

adding, by the at least two eNBs, physical resource information and modulation and coding scheme information to paging scheduling information, where the physical resource information and the modulation and coding scheme information are used to send the scrambled paging messages;

scrambling the paging scheduling information by using a preset first radio network temporary identifier RNTI; and delivering scrambled paging scheduling information to the UE, so that the UE decodes the scrambled paging scheduling information by using the stored first RNTI, acquires the physical resource information and the modulation and coding scheme information that are carried in decoded paging scheduling information, and receives the scrambled paging messages according to the acquired physical resource information and modulation and coding scheme information.

With reference to the first aspect, in a third possible implementation manner, when the information to be delivered to the UE is handover commands, the at least two eNBs include a source cell eNB and a target cell eNB;

the acquiring, by at least two eNBs, information to be delivered to UE specifically includes:

generating, by the source cell eNB, handover preparation request information, and sending the handover preparation request information to the target cell eNB, where the handover preparation request information carries information about a second scrambling code and information about a sending moment for sending the handover commands;

after receiving the handover preparation request information, generating, by the target cell eNB, handover preparation acknowledgment information carrying a handover request, and returning the handover preparation acknowledgment information to the source cell eNB; and using, by the source cell eNB, the handover request carried in the received handover preparation acknowledgment information as the acquired information to be delivered to the UE;

the scrambling, by using a same scrambling code, the information to be delivered to the UE specifically includes:

scrambling, by the source cell eNB and the target cell eNB, the handover commands by using the second scrambling code carried in the handover preparation request information; and the delivering scrambled information to the UE at a same moment specifically includes:

delivering, by the source cell eNB and the target cell eNB to the UE, scrambled handover commands at the sending moment carried in the handover preparation request information.

With reference to the third possible implementation manner, in the fourth possible implementation manner, before the acquiring, by at least two base stations eNBs, information to be delivered to user equipment UE, the method further includes:

delivering, by the source cell eNB, the information about the second scrambling code to the UE for storage.

With reference to the third or the fourth possible implementation manner, in a fifth possible implementation manner, before the delivering scrambled information to the UE at a same moment, the method further includes:

adding, by the source cell eNB and the target cell eNB, physical resource information and modulation and coding scheme information to handover scheduling information, where the physical resource information and modulation and the coding scheme information are used to send the scrambled handover commands;

scrambling the handover scheduling information by using a preset second radio network temporary identifier RNTI; and delivering scrambled handover scheduling information to the UE, so that the UE decodes the scrambled handover scheduling information by using the stored second RNTI, acquires the physical resource information and the modulation and coding scheme information that are carried in decoded handover scheduling information, and receives the scrambled handover commands according to the acquired physical resource information and modulation and coding scheme information.

According to a second aspect, an information receiving method is provided, including:

receiving, by user equipment UE, information that is delivered by at least two base stations eNBs at a same moment and is scrambled by using a same scrambling code; and combining and decoding the received scrambled information by using a prestored scrambling code used by the at least two eNBs.

With reference to the second aspect, in a first possible implementation manner, before the receiving, by UE, information that is delivered by at least two eNBs at a same moment and is scrambled by using a same scrambling code, the method further includes:

receiving and storing, by the UE, configuration information sent by a network management entity, where the configuration information carries information about a first scrambling code and parameter information that is used to determine a receiving moment for receiving paging messages;

the receiving, by UE, information that is delivered by at least two eNBs at a same moment and is scrambled by using a same scrambling code specifically includes:

determining, by the UE according to the parameter information carried in the configuration information, the receiving moment for receiving paging messages, and receiving, at the determined receiving moment, paging messages that are delivered by the at least two eNBs at the same moment and are scrambled by using the same scrambling code; and the combining and decoding the received scrambled information by using a prestored scrambling code used by the at least two eNBs specifically includes:

combining and decoding, by the UE, the received scrambled paging messages by using the first scrambling code carried in the configuration information.

With reference to the first possible implementation manner, in a second possible implementation manner, before the receiving, by the UE at the determined receiving moment, paging messages that are delivered by the at least two eNBs at the same moment and are scrambled by using the same scrambling code, the method further includes:

receiving, by the UE, paging scheduling information that is sent by the at least two eNBs and is scrambled by using a preset first radio network temporary identifier RNTI; and decoding the scrambled paging scheduling information by using the stored first RNTI, and acquiring physical resource information and modulation and coding scheme information that are carried in decoded paging scheduling information; and the receiving, by the UE at the determined receiving moment, paging messages that are delivered by the at least two eNBs at the same moment and are scrambled by using the same scrambling code specifically includes:

receiving, by the UE on a corresponding physical resource at the determined receiving moment according to the acquired physical resource information, the paging messages that are delivered by the at least two eNBs at the same moment and are scrambled by using the same scrambling code, and demodulating the received scrambled paging messages according to the acquired modulation and coding scheme information.

With reference to the second aspect, in a third possible implementation manner, before the receiving, by UE, information that is delivered by at least two eNBs at a same moment and is scrambled by using a same scrambling code, the method further includes:

receiving and storing, by the UE, information that is about a second scrambling code and sent by a source cell eNB;

the receiving, by UE, information that is delivered by at least two eNBs at a same moment and is scrambled by using a same scrambling code specifically includes:

receiving, by the UE, handover commands that are delivered by the source cell eNB and a target cell eNB at the same moment and are scrambled by using the second scrambling code, where a cell currently serving the UE is a source cell, and a cell to which the UE is to be handed over is a target cell; and the combining and decoding the received scrambled information by using a prestored scrambling code used by the at least two eNBs specifically includes:

combining and decoding, by the UE, the received scrambled handover commands by using the second scrambling code.

With reference to the third possible implementation manner, in a fourth possible implementation manner, before the receiving, by the UE, handover commands that are delivered by the source cell eNB and a target cell eNB at the same moment and are scrambled by using the second scrambling code, the method further includes:

receiving, by the UE, handover scheduling information that is sent by the source cell eNB and the target cell eNB and is scrambled by using a preset second radio network temporary identifier RNTI; and decoding the scrambled handover scheduling information by using the stored second RNTI, and acquiring physical resource information and modulation and coding scheme information that are carried in decoded handover scheduling information; and the receiving, by the UE, handover commands that are delivered by the source cell eNB and a target cell eNB at the same moment and are scrambled by using the second scrambling code specifically includes:

receiving, by the UE on a corresponding physical resource according to the acquired physical resource information, the handover commands that are delivered by the source cell eNB and the target cell eNB at the same moment and are scrambled by using the second scrambling code, and demodulating the received scrambled handover commands according to the acquired modulation and coding scheme information.

According to a third aspect, an information sending apparatus is provided, including:

an acquiring module, configured to acquire information to be delivered to user equipment UE;

a scrambling module, configured to scramble, by using an agreed scrambling code, the information that is to be delivered to the UE and is acquired by the acquiring module, where the agreed scrambling code is the same as a scrambling code that is used by another base station eNB to scramble the information to be delivered to the UE; and a sending module, configured to deliver, to the UE at an agreed moment, the information scrambled by the scrambling module, where the agreed moment is the same as a moment for delivering scrambled information to the UE by another eNB.

With reference to the third aspect, in a first possible implementation manner, the apparatus further includes:

a receiving module, configured to: when the information that is to be delivered to the UE and is acquired by the acquiring module is a paging message, before the scrambling module scrambles the information to be delivered to the UE, receive configuration information sent by a network management entity, where the configuration information carries information about a first scrambling code and parameter information that is used to determine a sending moment for sending the paging message, where the scrambling module is specifically configured to scramble the paging message by using the first scrambling code carried in the received configuration information; and the sending module is specifically configured to determine, according to the parameter information carried in the configuration information, the sending moment for sending the paging message, and deliver a scrambled paging message to the UE at the determined sending moment.

With reference to the first possible implementation manner, in a second possible implementation manner, the apparatus further includes:

a scheduling module, configured to: before the sending module delivers the scrambled information to the UE, add, to paging scheduling information, physical resource information and modulation and coding scheme information that are used to send the scrambled paging message, where the scrambling module is further configured to scramble, by using a preset first radio network temporary identifier RNTI, the paging scheduling information obtained by the scheduling module;

the sending module is further configured to deliver paging scheduling information scrambled by the scrambling module to the UE, so that the UE decodes the scrambled paging scheduling information by using the stored first RNTI, acquires the physical resource information and the modulation and coding scheme information that are carried in decoded paging scheduling information, and receives the scrambled paging message according to the acquired physical resource information and modulation and coding scheme information.

With reference to the third aspect, in a third possible implementation manner, the acquiring module is specifically configured to generate handover preparation request information, and send the handover preparation request information to a target cell eNB, where the handover preparation request information carries information about a second scrambling code and information about a sending moment for sending a handover command; receive handover preparation acknowledgment information that is returned by the target cell eNB and carries a handover request; and use the handover request carried in the received handover preparation acknowledgment information as the acquired information to be delivered to the UE;

the scrambling module is specifically configured to scramble the handover command by using the second scrambling code carried in the handover preparation request information; and the sending module is specifically configured to deliver a scrambled handover command to the UE at the sending moment carried in the handover preparation request information.

With reference to the third possible implementation manner, in a fourth possible implementation manner, the sending module is further configured to: before the acquiring module acquires the information to be delivered to the UE, send the information about the second scrambling code to the UE for storage.

With reference to the third or the fourth possible implementation manner, in a fifth possible implementation manner, the apparatus further includes:

a scheduling module, configured to: before the sending module delivers the scrambled information to the UE, add, to handover scheduling information, physical resource information and modulation and coding scheme information that are used to send the scrambled handover command, where the scrambling module is further configured to scramble, by using a preset second radio network temporary identifier RNTI, the handover scheduling information obtained by the scheduling module;

the sending module is further configured to deliver handover scheduling information scrambled by the scrambling module to the UE, so that the UE decodes the scrambled handover scheduling information by using the stored second RNTI, acquires the physical resource information and the modulation and coding scheme information that are carried in decoded handover scheduling information, and receives the scrambled handover command according to the acquired physical resource information and modulation and coding scheme information.

According to a fourth aspect, an information receiving apparatus is provided, including:

a first receiving module, configured to receive information that is delivered by at least two base stations eNBs at a same moment and is scrambled by using a same scrambling code; and a first decoding module, configured to combine and decode, by using a prestored scrambling code used by the at least two eNBs, the scrambled information received by the first receiving module.

With reference to the fourth aspect, in a first possible implementation manner, the apparatus further includes:

a second receiving module, configured to: before the first receiving module receives the information that is delivered by the at least two eNBs at the same moment and is scrambled by using the same scrambling code, receive and store configuration information sent by a network management entity, where the configuration information carries information about a first scrambling code and parameter information that is used to determine a receiving moment for receiving paging messages, where the first receiving module is specifically configured to determine, according to the parameter information carried in the configuration information, the receiving moment for receiving the paging messages, and receive, at the determined receiving moment, paging messages that are delivered by the at least two eNBs at the same moment and are scrambled by using the same scrambling code; and the first decoding module is specifically configured to combine and decode the received scrambled paging messages by using the first scrambling code carried in the configuration information.

With reference to the first possible implementation manner, in a second possible implementation manner, the apparatus further includes:

a third receiving module, configured to: before the first receiving module receives the paging messages that are delivered by the at least two eNBs at the same moment and are scrambled by using the same scrambling code, receive paging scheduling information that is sent by the at least two eNBs and is scrambled by using a preset first radio network temporary identifier RNTI; and a second decoding module, configured to decode, by using the stored first RNTI, the scrambled paging scheduling information received by the third receiving module, and acquire physical resource information and modulation and coding scheme information that are carried in decoded paging scheduling information, where the first receiving module is specifically configured to receive, on a corresponding physical resource at the determined receiving moment according to the physical resource information acquired by the second decoding module, the paging messages that are delivered by the at least two eNBs at the same moment and are scrambled by using the same scrambling code, and demodulate the received scrambled paging messages according to the modulation and coding scheme information acquired by the second decoding module.

With reference to the fourth aspect, in a third possible implementation manner, the apparatus further includes:

a second receiving module, configured to receive and store information that is about a second scrambling code and sent by a source cell eNB, where the first receiving module is specifically configured to receive handover commands that are delivered by the source cell eNB and a target cell eNB at a same moment and are scrambled by using the second scrambling code, where a cell currently serving the UE is a source cell, and a cell to which the UE is to be handed over is a target cell; and the first decoding module is specifically configured to combine and decode, by using the second scrambling code received by the second receiving module, the scrambled handover commands received by the first receiving module.

With reference to the third possible implementation manner, in a fourth possible implementation manner, the apparatus further includes:

a third receiving module, configured to: before the first receiving module receives the handover commands that are delivered by the source cell eNB and the target cell eNB at the same moment and are scrambled by using the second scrambling code, receive handover scheduling information that is sent by the source cell eNB and the target cell eNB and is scrambled by using a preset second radio network temporary identifier RNTI; and a second decoding module, configured to decode, by using the second RNTI received by the second receiving module, the scrambled handover scheduling information, and acquire physical resource information and modulation and coding scheme information that are carried in decoded handover scheduling information, where the first receiving module is specifically configured to receive, on a corresponding physical resource according to the physical resource information acquired by the second decoding module, the handover commands that are delivered by the source cell eNB and the target cell eNB at the same moment and are scrambled by using the second scrambling code, and demodulate the received scrambled handover commands according to the modulation and coding scheme information acquired by the second decoding module.

According to a fifth aspect, an information transmission system is provided, including at least two base stations eNBs and user equipment UE, where the at least two eNBs are configured to acquire information to be delivered to the UE; scramble, by using a same scrambling code, the information to be delivered to the UE; and deliver scrambled information to the UE at a same moment; and the UE is configured to receive the information that is delivered by the at least two eNBs at the same moment and is scrambled by using the same scrambling code, and combine and decode the received scrambled information by using a prestored scrambling code used by the at least two eNBs.

According to a sixth aspect, a base station is provided, including:

a receiver, configured to acquire information to be delivered to user equipment UE;

a signal processor, coupled to the receiver and a transmitter and configured to scramble, by using an agreed scrambling code, the information that is to be delivered to the UE and is acquired by the receiver, where the agreed scrambling code is the same as a scrambling code that is used by another base station eNB to scramble the information to be delivered to the UE; and the transmitter, configured to deliver, to the UE at an agreed moment, the information scrambled by the signal processor, where the agreed moment is the same as a moment for delivering scrambled information to the UE by another eNB.

According to a seventh aspect, user equipment is provided, including:

a receiver, configured to receive information that is delivered by at least two base stations eNBs at a same moment and is scrambled by using a same scrambling code; and a decoder, coupled to the receiver and configured to combine and decode, by using a prestored scrambling code used by the at least two eNBs, the scrambled information received by the receiver.

The embodiments of the present invention provide information sending and receiving methods and apparatuses, and an information transmission system. The method includes: acquiring, by at least two eNBs, information to be delivered to UE; scrambling, by using a same scrambling code, the information to be delivered to the UE; and delivering scrambled information to the UE at a same moment. In the foregoing method, the at least two eNBs deliver, at the same moment, the information scrambled by using the same scrambling code to the UE, so that the UE can receive at least two pieces of information scrambled by using the same scrambling code; therefore, compared with a method in which UE can receive only one piece of scrambled information in the prior art, the foregoing method provided in the embodiments of the present invention can improve accuracy of receiving, by cell-edge UE, information sent by eNBs.

DETAILED DESCRIPTION

Figure 1:
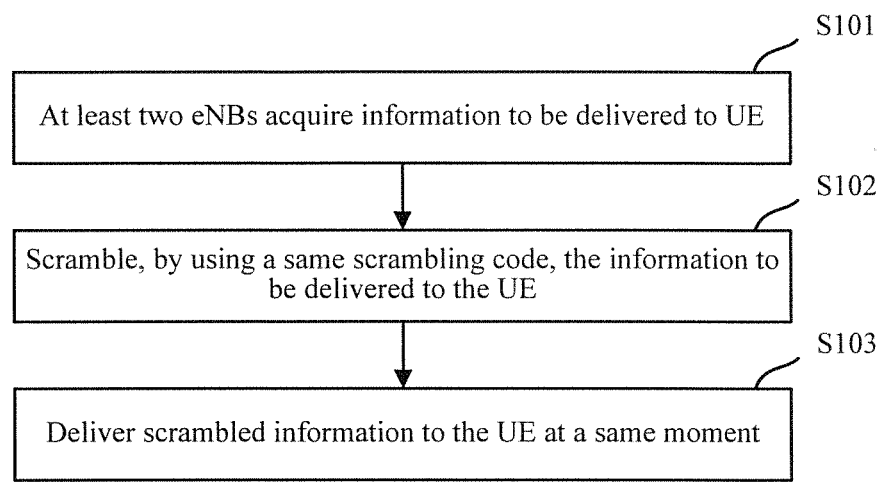
FIG. 1 shows an information sending process according to an embodiment of the present invention.

Embodiments of the present invention provide information sending and receiving methods and apparatuses, and an information transmission system. The method includes: acquiring, by at least two eNBs, information to be delivered to UE; scrambling, by using a same scrambling code, the information to be delivered to the UE; and delivering scrambled information to the UE at a same moment. In the foregoing method, the at least two eNBs deliver, at the same moment, the information scrambled by using the same scrambling code to the UE, so that the UE can perform combination and decoding by using the same scrambling code after receiving the scrambled information delivered by each eNB; therefore, cell-edge UE can still accurately receive information sent by eNBs.

Technologies described in this specification are applicable to various communications systems, for example, current 2G and 3G communications systems and a next-generation communications system, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency division multiple access (OFDMA) system, a single-carrier FDMA (SC-FDMA) system, a general packet radio service (GPRS) system, a long term evolution (LTE) system, and other communications systems.

This specification describes various aspects with reference to user equipment and/or a base station.

The user equipment may be a wireless terminal. The wireless terminal may refer to a device that provides a user with voice and/or data connectivity, a handheld device with a wireless connection function, or another processing device connected to a wireless modem. The wireless terminal may communicate with one or more core networks through a radio access network (such as RAN, Radio Access Network). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, or a personal digital assistant (PDA). The wireless terminal may also be called a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device, in an access network, in communication with a wireless terminal via one or more sectors at an air interface. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS) in GSM or CDMA, may be a base station (NodeB) in WCDMA, or may be an evolved NodeB (NodeB, eNB, or e-NodeB, evolved Node B) in LTE, which is not limited in this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Solutions in the embodiments of the present invention are described below in detail with reference to the accompanying drawings of the specification.

In the embodiments of the present invention, at least two eNBs scramble, by using a same scrambling code, information to be delivered to UE, and deliver scrambled information to the UE at a same moment; correspondingly, the UE receives the scrambled information delivered by the at least two eNBs, and combines and decodes the received scrambled information by using a prestored scrambling code used by the at least two eNBs, as shown in FIG. 1.

Embodiment 1

FIG. 1 shows an information sending process according to an embodiment of the present invention. The information sending process specifically includes the following steps:

S101: At least two eNBs acquire information to be delivered to UE.

In this embodiment of the present invention, the information to be delivered to the UE includes but is not limited to paging messages, handover commands, and other signaling messages. The at least two eNBs may acquire, from a core network or another network entity (for example, an operation and maintenance management entity), the information to be delivered to the UE, or may acquire, by means of interaction between the at least two eNBs, the information to be delivered to the UE, or may generate, by themselves, the information to be delivered to the UE. The at least two eNBs may be eNBs of cells in one TA, or may be eNBs in a preconfigured area including at least two eNBs, which is not limited in the present invention. It can be understood that, the eNB in this embodiment of the present invention may be replaced with a cell, which is not limited in the present invention.

S102: Scramble, by using a same scrambling code, the information to be delivered to the UE.

In this embodiment of the present invention, the at least two eNBs may prestore scrambling codes to be used, where the scrambling codes prestored by the eNBs are the same. The prestored scrambling codes may be scrambling codes that are sent by a network management entity to the eNBs in advance, may be agreed on by the eNBs, or may be fixed in a transmission protocol. After acquiring the information to be delivered to the UE, the eNBs may scramble, by using the prestored scrambling code, the information to be delivered to the UE.

S103: Deliver scrambled information to the UE at a same moment.

In this embodiment of the present invention, a sending moment for delivering the scrambled information to the UE by the eNBs may be sent by the network management entity to the eNBs in advance, may be agreed on by the eNBs, or may be fixed in a transmission protocol. After scrambling, by using the same scrambling code, the information to be delivered to the UE, the eNBs may deliver the scrambled information to the UE at the sending moment that is sent by the network management entity in advance, or at the sending moment that is agreed on by the eNBs in advance.

Figure 2:
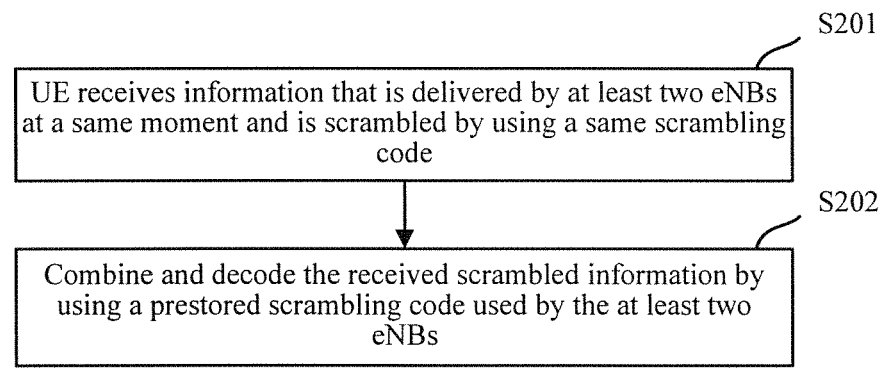
FIG. 2 shows an information receiving process based on FIG. 1 according to an embodiment of the present invention.

Correspondingly, a process in which the UE receives the scrambled information delivered by the eNBs is shown in FIG. 2.

FIG. 2 shows an information receiving process based on FIG. 1 according to an embodiment of the present invention. The information receiving process specifically includes the following steps:

S201: UE receives information that is delivered by at least two eNBs at a same moment and is scrambled by using a same scrambling code.

In this embodiment of the present invention, after receiving a sending moment that is sent by a core network or another network entity and for sending information to be delivered to the UE, or agreeing on a sending moment for sending information to be delivered to the UE, the eNBs may notify the sending moment to the UE, and the UE receives, at the notified moment, the information that is delivered by the eNBs and is scrambled by using the same scrambling code.

S202: Combine and decode the received scrambled information by using a prestored scrambling code used by the at least two eNBs.

In this embodiment of the present invention, after receiving a scrambling code that is to be used and is sent by the core network or another network entity, or agreeing on a scrambling code to be used, the eNBs may notify the scrambling code to be used to the UE, and after receiving the scrambled information delivered by the eNBs, the UE combines and decodes, by using the notified scrambling code, the received scrambled information. Specifically, the UE may first combine the received scrambled information, and then decode combined information by using the notified scrambling code; or may first separately decode the received scrambled information by using the notified scrambling code, and if no scrambled information can be decoded successfully, combine the scrambled information, and decode the scrambled information, which is not limited herein.

In the foregoing method, at least two eNBs may deliver, at a same moment, information scrambled by using a same scrambling code to UE, so that the UE can perform combination and decoding by using the same scrambling code after receiving the scrambled information delivered by the eNBs; therefore, even cell-edge UE can still accurately receive information sent by eNBs. In fact, the eNBs scramble, by using the same scrambling code, the information to be delivered, and send the scrambled information at the same moment; for the UE, the scrambled information received by the UE is equivalent to a multipath signal, and the UE needs to process only the multipath signal.

The foregoing information sending and receiving methods are applicable to an application scenario in which at least two eNBs exchange information with UE, for example, a scenario in which eNBs in one TA deliver paging messages to UE, or a scenario in which a source cell eNB and a target cell eNB deliver handover commands to UE, and a detailed description is provided below.

Embodiment 2

Figure 3:
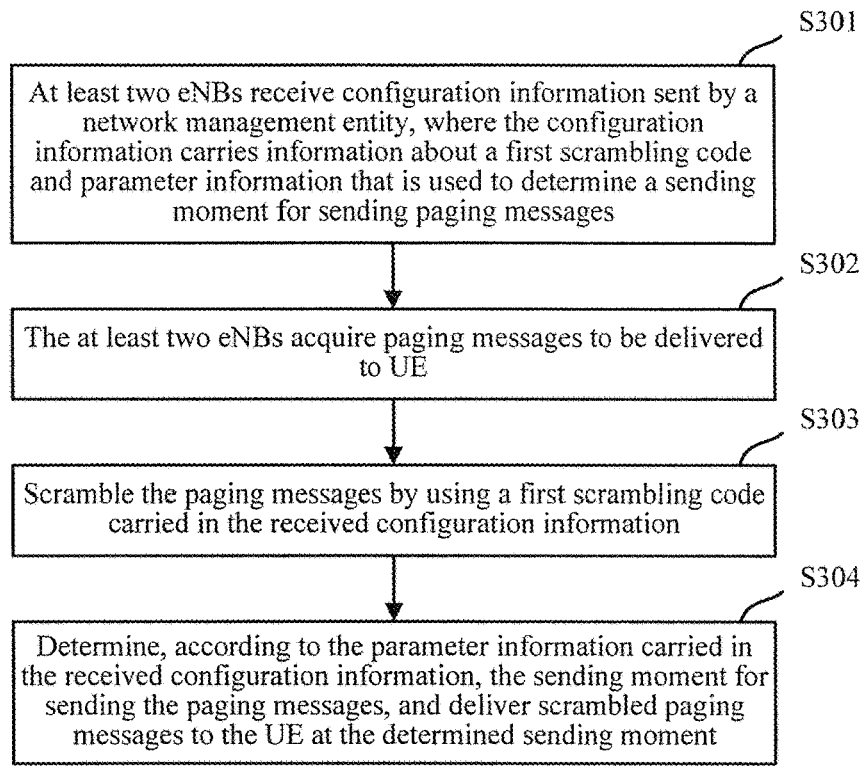
FIG. 3 shows a paging message sending process according to an embodiment of the present invention.

In Embodiment 2, by using a scenario in which eNBs deliver paging messages to UE as an example, information sending and receiving methods provided in the embodiment of the present invention are described in detail, as shown in FIG. 3.

FIG. 3 shows a paging message sending process according to an embodiment of the present invention. The process specifically includes the following steps:

S301: At least two eNBs receive configuration information sent by a network management entity, where the configuration information carries information about a first scrambling code and parameter information that is used to determine a sending moment for sending paging messages.

In this embodiment of the present invention, the network management entity may deliver, to the eNBs in advance, the configuration information carrying the information about the first scrambling code and the parameter information that is used to determine the sending moment. Specifically, the network management entity may deliver, to the eNBs, the configuration information carrying the information about the first scrambling code, a paging cycle T, and a parameter (nB) that is used to determine a paging group quantity and a paging subframe quantity of each radio frame. The eNBs store the received configuration information, where the eNBs can determine, according to the paging cycle T and nB that are in the configuration information, the sending moment for sending the paging messages.

By using an FDD system as an example, in a scenario in which UE is called, assuming that a UE_ID is 0, a paging cycle T is 32 radio frames (that is, 320 milliseconds), and nB is twice the paging cycle, the eNBs can determine that paging frame numbers used for sending paging messages are frame numbers that meet the following formula: SFN mod T=(T div min (T, nB))*(UE_ID mod min (T, nB)), that is, the paging frame numbers are 0, 32, 64, and the like; moreover, the eNBs determine that paging subframe numbers used for sending paging messages are subframe numbers corresponding to i_s that meets the following formula: i_s=floor (UE_ID/min (T, nB)) mod max (1, nB/T), it is calculated that i_s=0, and a corresponding paging subframe number is 4. Based on the foregoing calculation of the paging frames and paging subframes, it may be determined that moments for sending the paging messages are No. 4 subframe of No. 0 frame, No. 4 subframe of No. 32 frame, No. 4 subframe of No. 64 frame, and the like. If the paging cycle T is 32 radio frames, and nB is equal to the paging cycle, the eNBs can determine that moments for sending the paging messages are No. 9 subframe of No. 0 frame, No. 9 subframe of No. 32 frame, No. 9 subframe of No. 64 frame, and the like.

Certainly, the first scrambling code and the sending moment for sending the paging messages may also be agreed on by the eNBs in advance, or may be fixed in a protocol, and in this embodiment of the present invention, descriptions are provided by using an example in which the first scrambling code and the sending moment are delivered by the network management entity.

Certainly, in a case of a system information update scenario or an ETWS information scenario, an eNB needs to send a paging message at all possible moments for sending the paging message, so that all UE of the eNB can receive the paging message, to obtain updated system information or ETWS information.

S302: The at least two eNBs acquire paging messages to be delivered to UE.

In this embodiment of the present invention, the eNBs may acquire, from a core network or another network entity, paging messages to be delivered, for example, when the UE is called, eNBs in a TA in which the UE is located may acquire, from the core network, paging messages carrying an identifier of the UE; or, when system information of all of multiple cells in the TA is changed, the eNBs in the TA may acquire, from the core network, paging messages carrying updated system information of the cells; or, the eNBs in the TA may acquire, from the core network, paging information carrying ETWS information.

S303: Scramble the paging messages by using the first scrambling code carried in the received configuration information.

Because the eNBs have stored the configuration information carrying a same scrambling code (that is, the first scrambling code), after acquiring the paging messages to be delivered, the eNBs can scramble the paging messages by using the first scrambling code carried in the configuration information.

S304: Determine, according to the parameter information carried in the received configuration information, the sending moment for sending the paging messages, and deliver scrambled paging messages to the UE at the determined sending moment.

Because the eNBs have stored the configuration information, the eNBs can determine, according to the parameter information that is carried in the stored configuration information and is used to determine the sending moment for sending the paging messages, the sending moment for sending the paging messages; after the paging messages are scrambled by using the first scrambling code, the eNBs may deliver the scrambled paging messages to the UE at the determined sending moment.

Figure 4:
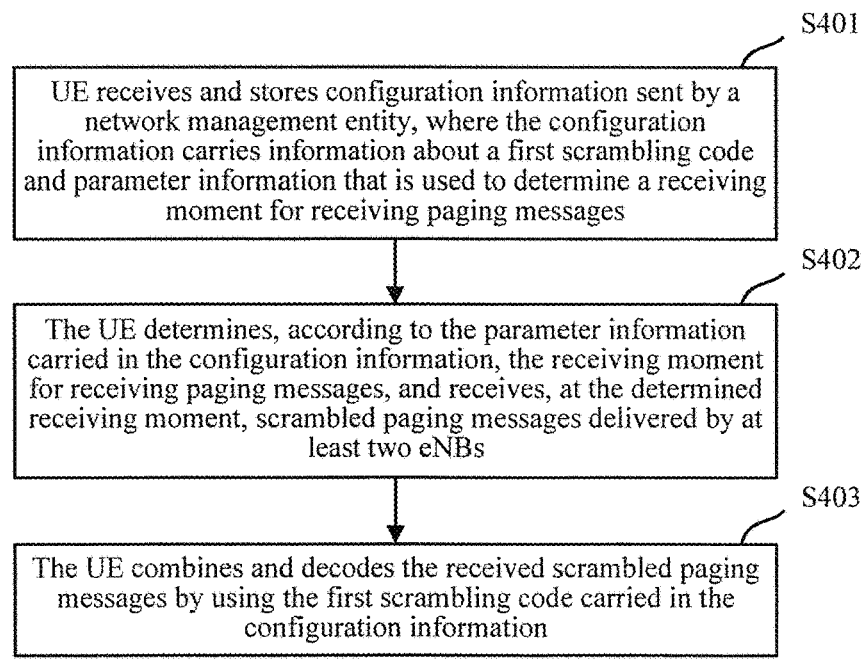
FIG. 4 shows a paging message receiving process based on FIG. 3 according to an embodiment of the present invention.

Correspondingly, a process in which the UE receives the paging messages delivered by the eNBs is shown in FIG. 4.

FIG. 4 shows a paging message receiving process based on FIG. 3 according to an embodiment of the present invention. The process specifically includes the following steps:

S401: UE receives and stores configuration information sent by a network management entity, where the configuration information carries information about a first scrambling code and parameter information that is used to determine a receiving moment for receiving paging messages.

In this embodiment of the present invention, the network management entity may deliver, to the UE in advance by using eNBs, the configuration information carrying the information about the first scrambling code and the parameter information that is used to determine the receiving moment for receiving paging messages. Similarly, the network management entity may deliver, to the UE by using eNBs, configuration information carrying the information about the first scrambling code, a paging cycle T, and a parameter (nB) that is used to determine a paging group quantity and a paging subframe quantity of each radio frame. The UE stores the received configuration information, where the UE can determine, according to the paging cycle T and nB that are in the configuration information, the receiving moment for receiving paging messages.

S402: The UE determines, according to the parameter information carried in the configuration information, the receiving moment for receiving paging messages, and receives, at the determined receiving moment, paging messages that are delivered by at least two eNBs and are scrambled by using a same scrambling code.

Because the UE has stored the configuration information, the UE can determine, according to the parameter information that is carried in the stored configuration information and is used to determine the receiving moment for receiving paging messages, the receiving moment for receiving paging messages, and receive, at the determined receiving moment, the paging messages that are delivered by the eNBs and are scrambled by using the same scrambling code.

S403: The UE combines and decodes the received scrambled paging messages by using the first scrambling code carried in the configuration information.

Because the UE has stored the configuration information carrying the first scrambling code, after receiving the scrambled paging messages delivered by the eNBs, the UE may decode the received scrambled paging messages by using the first scrambling code carried in the configuration information. Specifically, the UE may first combine the received scrambled paging messages, and then decode a combined paging message by using the first scrambling code; or the UE may first decode the scrambled paging messages separately by using the first scrambling code, and if no scrambled paging message can be successfully decoded, combine the scrambled paging messages, and then decode a combined paging message, which is not limited herein.

If a paging message obtained after combination and decoding by the UE carries an identifier of the UE, the UE may return a paging response to the core network by using an eNB in a cell on which the UE camps, and establish a session connection; if the paging message obtained after combination and decoding carries updated system information of a cell in which the UE is located, the UE correspondingly updates system information, which is stored by the UE, of the cell; if the paging message obtained after combination and decoding by the UE carries ETWS information, the UE may further read the ETWS information.

Further, in the paging message sending process shown in FIG. 3, before delivering the scrambled paging messages to the UE, the eNBs may further add, to paging scheduling information, physical resource information and modulation and coding scheme information that are used to send the scrambled paging messages, scramble the paging scheduling information by using a preset first radio network temporary identifier (RNTI), and deliver scrambled paging scheduling information to the UE. Physical resources and modulation and coding schemes that are used by the eNBs to send the paging messages are also the same. Both the physical resource and the modulation and coding scheme that are to be used may be delivered by the core network or another network management entity in advance to the eNBs, or may be agreed on in advance by the eNBs, or may be fixed in a transmission protocol.

Correspondingly, before receiving the scrambled paging messages delivered by the eNBs, the UE may receive the paging scheduling information that is delivered by the eNBs and is scrambled by using the first RNTI, decode the scrambled paging scheduling information according to the first RNTI, and acquire the physical resource information and the modulation and coding scheme information that are carried in decoded paging scheduling information. When receiving the scrambled paging messages delivered by the eNBs, the UE may receive, on a corresponding physical resource according to the acquired physical resource information at the receiving moment determined according to the configuration information, the paging messages that are delivered by the eNBs and are scrambled by using the same scrambling code, and demodulate the received scrambled paging messages according to the acquired modulation and coding scheme information.

The first RNTI may be fixed in a protocol in advance, or may be delivered to the eNBs and the UE by the core network or another network management entity, or may be sent to the UE after the eNBs obtain the first RNTI. A specific sending method may be sending the first RNTI by using a system broadcast message. It can be understood that, the eNBs acquire the first RNTI before sending the paging messages, and the UE acquires the first RNTI before receiving the paging messages. The first RNTI may be a P-RNTI in the prior art, or may be a new RNTI, which is not limited herein.

Described above are processes in which eNBs deliver paging messages to UE and the UE receives the paging messages provided in this embodiment of the present invention. Processes in which eNBs deliver handover commands and UE receives the handover commands during a cell handover of the UE are described below in detail.

Embodiment 3

Figure 5:
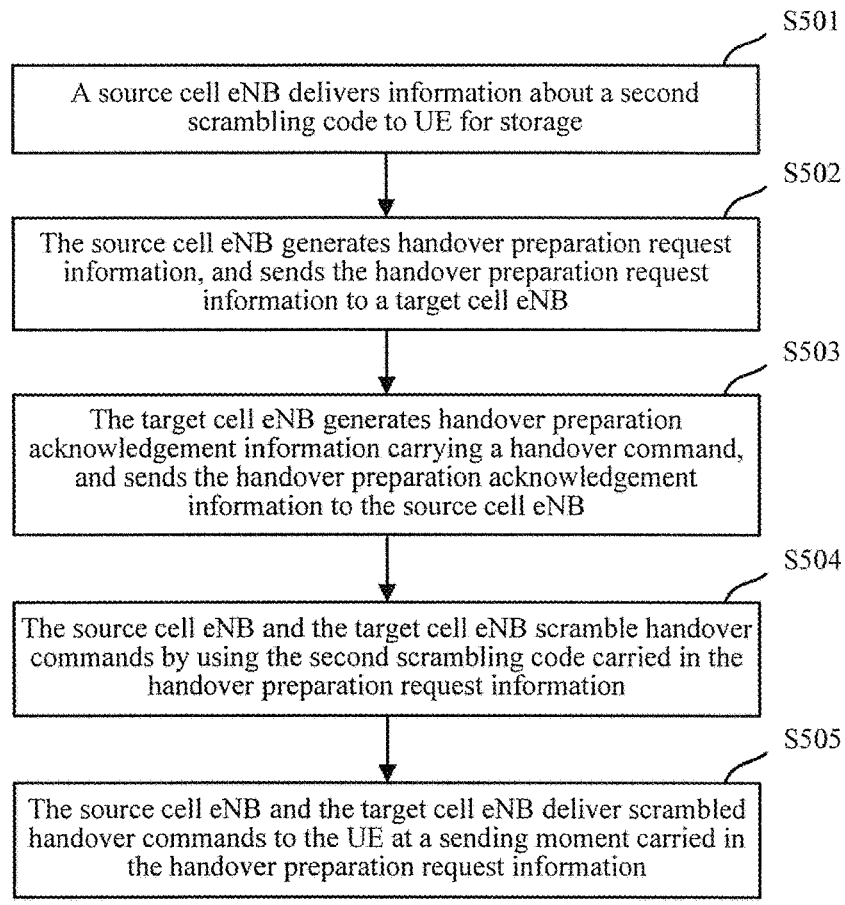
FIG. 5 shows a handover command sending process according to an embodiment of the present invention.

In Embodiment 3, by using a scenario in which each eNB sends a handover command to UE as an example, information sending and receiving methods provided in the embodiments of the present invention are described in detail, as shown in FIG. 5.

FIG. 5 shows a handover command sending process according to an embodiment of the present invention. The process specifically includes the following steps:

S501: A source cell eNB delivers information about a second scrambling code to UE for storage.

In this embodiment of the present invention, a cell currently serving the UE is a source cell, and a cell to which the UE is to be handed over is a target cell. The source cell eNB may deliver the information about the second scrambling code to the UE at any moment when serving the UE, where the information about the second scrambling code is pre-stored by the source cell eNB.

S502: The source cell eNB generates handover preparation request information, and sends the handover preparation request information to a target cell eNB.

When needing to be handed over from a source cell to a target cell, the UE first reports a measurement report to the source cell eNB, and the source cell eNB performs handover determining. When the source cell eNB determines to perform a handover, the source cell eNB generates handover preparation request information, and sends the handover preparation request information to the target cell eNB. The handover preparation request information carries the information about the second scrambling code and information about a sending moment for sending a handover command. Certainly, the handover preparation request information may further include information, such as a physical resource and a modulation and coding scheme, used to send the handover command.

In addition, it should be noted that, for the sending moment for delivering the handover command, the sending moment may also be determined by the target cell eNB and notified to the source cell eNB, that is, handover preparation acknowledgment information sent by the target cell eNB to the source cell eNB (that is, subsequent step S503) carries the sending moment. However, the second scrambling code used to scramble the handover command needs to be determined by the source cell eNB and is notified to the target cell eNB, because the second scrambling code is stored by the source cell eNB; when the UE is in the source cell, the source cell eNB has delivered the second scrambling code to the UE, and if the target cell eNB determines a scrambling code and notifies the scrambling code to the source cell eNB, the UE cannot normally decode a scrambled handover command subsequently.

Similarly, the information, such as a physical resource and a modulation and coding scheme, used to send the handover command may also be determined by the target cell eNB and notified to the source cell eNB, that is, the handover preparation acknowledgment information sent by the target cell eNB to the source cell eNB (that is, subsequent step S503) carries the information, such as a physical resource and a modulation and coding scheme, used to send the handover command.

S503: The target cell eNB generates handover preparation acknowledgment information carrying a handover command, and sends the handover preparation acknowledgment information to the source cell eNB.

After receiving the handover preparation request information sent by the source cell eNB, the target cell eNB generates the handover preparation acknowledgment information carrying the handover command, and returns the handover preparation acknowledgment information to the source cell eNB, so that the source cell eNB obtains the handover command.

S504: The source cell eNB and the target cell eNB scramble handover commands by using the second scrambling code carried in the handover preparation request information.

Because the source cell eNB and the target cell eNB have agreed on the second scrambling code used for scrambling, the source cell eNB and the target cell eNB scramble the handover commands by using the agreed second scrambling code.

S505: The source cell eNB and the target cell eNB deliver scrambled handover commands to the UE at a sending moment carried in the handover preparation request information.

Because the source cell eNB and the target cell eNB have agreed on the sending moment for sending the handover commands, the source cell eNB and the target cell eNB deliver the scrambled handover commands to the UE at the agreed sending moment.

Optionally, when the handover preparation request information carries information about a physical resource and a modulation and coding scheme used to send the handover commands, the source cell eNB and the target cell eNB may deliver the scrambled handover commands to the UE at the agreed sending moment by using the physical resource and the modulation and coding scheme that are carried in the handover preparation request information.

It can be understood that, when the source cell eNB and the target cell eNB are a same eNB, the handover preparation request information and the handover preparation acknowledgment information are received and sent by the same eNB.

Figure 6:
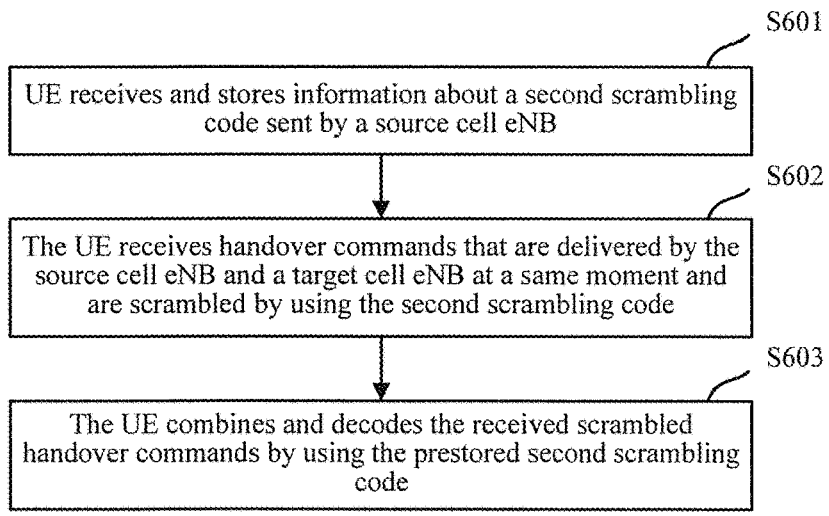
FIG. 6 shows a handover command receiving process based on FIG. 5 according to an embodiment of the present invention.

Correspondingly, a process in which UE receives handover commands delivered by a source cell eNB and a target cell eNB is shown in FIG. 6.

FIG. 6 shows a handover command receiving process based on FIG. 5 according to an embodiment of the present invention. The process specifically includes the following steps:

S601: UE receives and stores information that is about a second scrambling code and sent by a source cell eNB.

In this embodiment of the present invention, when a source cell serves the UE, the UE receives and stores the information that is about the second scrambling code and sent by the source cell eNB, so as to decode a handover command subsequently.

S602: The UE receives handover commands that are delivered by the source cell eNB and a target cell eNB at a same moment and are scrambled by using the second scrambling code.

The source cell eNB and the target cell eNB send the scrambled handover commands to the UE by using the method shown in FIG. 5.

S603: The UE combines and decodes the received scrambled handover commands by using the prestored second scrambling code.

When receiving the scrambled handover commands sent by the source cell eNB and the target cell eNB, the UE may combine and decode the received scrambled handover commands by using the prestored second scrambling code, and complete a cell handover according to handover commands that are obtained after combination and decoding. Specifically, the UE may first combine the received scrambled handover commands, and then decode a combined handover command by using the second scrambling code; or may first decode the received handover commands by using the second scrambling code, and if no scrambled handover command can be decoded successfully, combine the scrambled handover commands, and decode a combined handover command, which is not limited herein.

Further, in the handover command sending process shown in FIG. 5, before delivering the scrambled handover commands to the UE, the source cell eNB and the target cell eNB may further add, to handover scheduling information, physical resource information and modulation and coding scheme information (where the used physical resource information and modulation and coding scheme information are determined by the source cell eNB and notified, by using handover preparation request information, to the target cell eNB, or certainly, may be determined by the target cell eNB and notified, by using handover preparation acknowledgment information, to the source cell eNB) that are used to send the scrambled handover commands, scramble the handover scheduling information by using a preset second RNTI, and then deliver scrambled handover scheduling information to the UE. Correspondingly, before receiving the scrambled handover commands, the UE receives the handover scheduling information that is sent by the source cell eNB and the target cell eNB and is scrambled by using the preset second RNTI, decodes the scrambled handover scheduling information by using the stored second RNTI, acquires the physical resource information and the modulation and coding scheme information that are carried in decoded handover scheduling information, receives, on a corresponding physical resource according to the acquired physical resource information, the handover commands that are delivered by the source cell eNB and the target cell eNB at the same moment and are scrambled by using the second scrambling code, and demodulates the received scrambled handover commands according to the acquired modulation and coding scheme information.

The second RNTI may be delivered by a core network or another network management entity to the eNBs and the UE; or may be sent by a core network or another management entity to the eNBs, and then may be sent by the source cell eNB to the UE. A specific method may be sending the second RNTI by using a system broadcast message, a dedicated radio resource control (RRC) message, or the like, which is not limited herein.

Further, after combining and decoding the received scrambled handover commands, the UE may further send feedback information to the source cell eNB and/or the target cell eNB according to a decoding situation, so that the source cell eNB and/or the target cell eNB determine/ determines, according to the feedback information, whether to perform retransmission. If the feedback information is that the scrambled handover commands are not successfully decoded, the source cell eNB and/or the target cell eNB may perform retransmission.

Described above are processes in which a source cell eNB and a target cell eNB deliver handover commands to UE and the UE receives the handover commands provided in this embodiment of the present invention.

The information sending and receiving methods provided in Embodiment 1 of the present invention are not only applicable to scenarios of receiving and sending paging messages and handover commands, but also applicable to other scenarios in which more than two eNBs transmit information with UE, and details are not described herein again. Based on the same idea, the embodiments of the present invention further provide information sending and receiving apparatuses, and an information transmission system, which are described below in detail.

Embodiment 4

Figure 7:
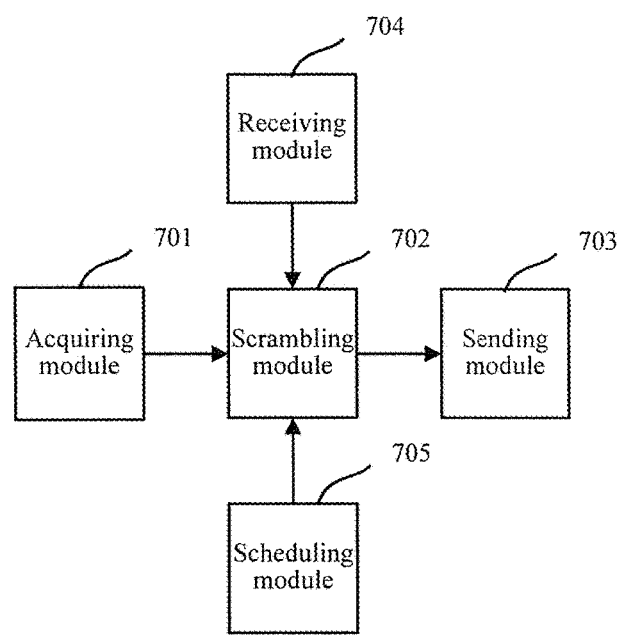
FIG. 7 shows a schematic structural diagram of an information sending apparatus according to an embodiment of the present invention.

FIG. 7 shows a schematic structural diagram of an information sending apparatus according to an embodiment of the present invention. The apparatus specifically includes:

an acquiring module 701, configured to acquire information to be delivered to user equipment UE;

a scrambling module 702, configured to scramble, by using an agreed scrambling code, the information that is to be delivered to the UE and is acquired by the acquiring module 701, where the agreed scrambling code is the same as a scrambling code that is used by another base station eNB to scramble the information to be delivered to the UE; and a sending module 703, configured to deliver, to the UE at an agreed moment, the information scrambled by the scrambling module 702, where the agreed moment is the same as a moment for delivering scrambled information to the UE by another eNB.

The apparatus further includes:

a receiving module 704, configured to: when the information that is to be delivered to the UE and is acquired by the acquiring module 701 is a paging message, before the scrambling module 702 scrambles the information to be delivered to the UE, receive configuration information sent by a network management entity, where the configuration information carries information about a first scrambling code and parameter information that is used to determine a sending moment for sending the paging message, where the scrambling module 702 is specifically configured to scramble the paging message by using the first scrambling code carried in the received configuration information; and the sending module 703 is specifically configured to determine, according to the parameter information carried in the configuration information, the sending moment for sending the paging message, and deliver a scrambled paging message to the UE at the determined sending moment.

The apparatus further includes:

a scheduling module 705, configured to: before the sending module 703 delivers the scrambled information to the UE, add, to paging scheduling information, physical resource information and modulation and coding scheme information that are used to send the scrambled paging message, where the scrambling module 702 is further configured to scramble, by using a preset first radio network temporary identifier RNTI, the paging scheduling information obtained by the scheduling module 705; and the sending module 703 is further configured to deliver the paging scheduling information scrambled by the scrambling module 702 to the UE, so that the UE decodes the scrambled paging scheduling information by using the stored first RNTI, acquires the physical resource information and the modulation and coding scheme information that are carried in decoded paging scheduling information, and receives the scrambled paging message according to the acquired physical resource information and modulation and coding scheme information.

The acquiring module 701 is specifically configured to generate handover preparation request information, and send the handover preparation request information to a target cell eNB, where the handover preparation request information carries information about a second scrambling code and information about a sending moment for sending a handover command; receive handover preparation acknowledgment information that is returned by the target cell eNB and carries a handover request; and use the handover request carried in the received handover preparation acknowledgment information as the acquired information to be delivered to the UE;

the scrambling module 702 is specifically configured to scramble the handover command by using the second scrambling code carried in the handover preparation request information; and the sending module 703 is specifically configured to deliver a scrambled handover command to the UE at the sending moment carried in the handover preparation request information.

The sending module 703 is further configured to: before the acquiring module 701 acquires the information to be delivered to the UE, send the information about the second scrambling code to the UE for storage.

The apparatus further includes:

a scheduling module 705, configured to: before the sending module 703 delivers the scrambled information to the UE, add, to handover scheduling information, physical resource information and modulation and coding scheme information that are used to send the scrambled handover command, where the scrambling module 702 is further configured to scramble, by using a preset second radio network temporary identifier RNTI, the handover scheduling information obtained by the scheduling module 705; and the sending module 703 is further configured to deliver handover scheduling information scrambled by the scrambling module 702 to the UE, so that the UE decodes the scrambled handover scheduling information by using the stored second RNTI, acquires the physical resource information and the modulation and coding scheme information that are carried in decoded handover scheduling information, and receives the scrambled handover command according to the acquired physical resource information and modulation and coding scheme information.

Specifically, the foregoing information sending apparatus may be located in an eNB.

Figure 8:
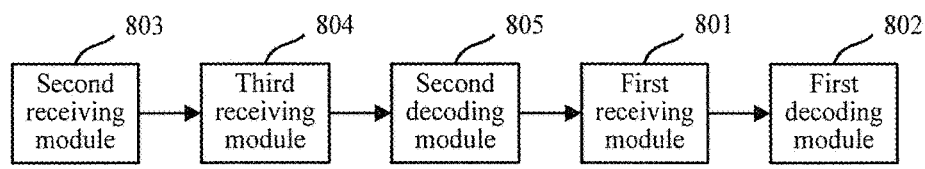
FIG. 8 shows a schematic structural diagram of an information receiving apparatus according to an embodiment of the present invention.

FIG. 8 shows a schematic structural diagram of an information receiving apparatus according to an embodiment of the present invention. The apparatus specifically includes:

a first receiving module 801, configured to receive information that is delivered by at least two base stations eNBs at a same moment and is scrambled by using a same scrambling code; and a first decoding module 802, configured to combine and decode, by using a prestored scrambling code used by the at least two eNBs, the scrambled information received by the first receiving module 801.

The apparatus further includes:

a second receiving module 803, configured to: before the first receiving module 801 receives the information that is delivered by the at least two eNBs at the same moment and is scrambled by using the same scrambling code, receive and store configuration information sent by a network management entity, where the configuration information carries information about a first scrambling code and parameter information that is used to determine a receiving moment for receiving paging messages, where the first receiving module 801 is specifically configured to determine, according to the parameter information carried in the configuration information, the receiving moment for receiving paging messages, and receive, at the determined receiving moment, paging messages that are delivered by the at least two eNBs at the same moment and are scrambled by using the same scrambling code; and the first decoding module 802 is specifically configured to combine and decode the received scrambled paging messages by using the first scrambling code carried in the configuration information.

The apparatus further includes:

a third receiving module 804, configured to: before the first receiving module 801 receives the paging messages that are delivered by the at least two eNBs at the same moment and are scrambled by using the same scrambling code, receive paging scheduling information that is sent by the at least two eNBs and is scrambled by using a preset first radio network temporary identifier RNTI; and a second decoding module 805, configured to decode, by using the stored first RNTI, the scrambled paging scheduling information received by the third receiving module 804, and acquire physical resource information and modulation and coding scheme information that are carried in decoded paging scheduling information, where the first receiving module 801 is specifically configured to receive, on a corresponding physical resource at the determined receiving moment according to the physical resource information acquired by the second decoding module 805, the paging messages that are delivered by the at least two eNBs at the same moment and are scrambled by using the same scrambling code, and demodulate the received scrambled paging messages according to the modulation and coding scheme information acquired by the second decoding module 805.

The apparatus further includes:

a second receiving module 803, configured to receive and store information that is about a second scrambling code and sent by a source cell eNB, where the first receiving module 801 is specifically configured to receive handover commands that are delivered by the source cell eNB and a target cell eNB at a same moment and are scrambled by using the second scrambling code, where a cell currently serving the UE is a source cell, and a cell to which the UE is to be handed over is a target cell; and the first decoding module 802 is specifically configured to combine and decode, by using the second scrambling code received by the second receiving module 803, the scrambled handover commands received by the first receiving module 801.

The apparatus further includes:

a third receiving module 804, configured to: before the first receiving module 801 receives the handover commands that are delivered by the source cell eNB and the target cell eNB at the same moment and are scrambled by using the second scrambling code, receive handover scheduling information that is sent by the source cell eNB and the target cell eNB and is scrambled by using a preset second radio network temporary identifier RNTI; and a second decoding module 805, configured to decode, by using the second RNTI received by the second receiving module 803, the scrambled handover scheduling information, and acquire physical resource information and modulation and coding scheme information that are carried in decoded handover scheduling information, where the first receiving module 801 is specifically configured to receive, on a corresponding physical resource according to the physical resource information acquired by the second decoding module 805, the handover commands that are delivered by the source cell eNB and the target cell eNB at the same moment and are scrambled by using the second scrambling code, and demodulate the received scrambled handover commands according to the modulation and coding scheme information acquired by the second decoding module 805.

Specifically, the foregoing information receiving apparatus may be located in UE.

Figure 9:
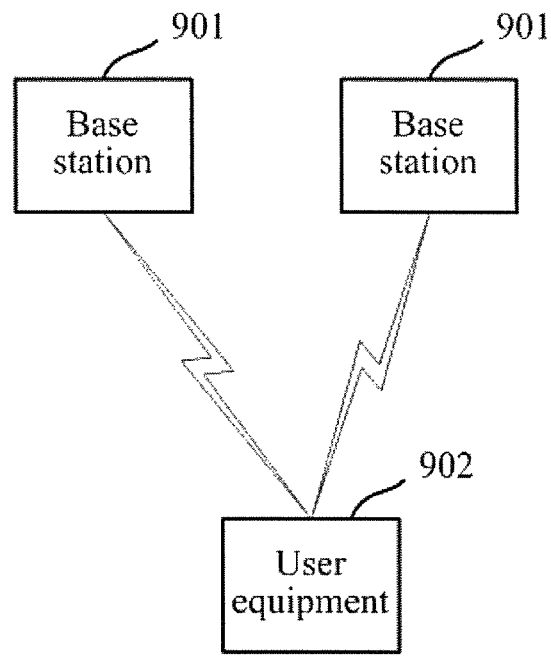
FIG. 9 shows a schematic structural diagram of an information transmission system according to an embodiment of the present invention.

FIG. 9 is a schematic structural diagram of an information transmission system according to an embodiment of the present invention. The information transmission system includes at least two base stations eNBs 901 and user equipment UE 902, where the at least two eNBs 901 are configured to acquire information to be delivered to the UE 902; scramble, by using a same scrambling code, the information to be delivered to the UE 902, and deliver scrambled information to the UE 902 at a same moment; and the UE 902 is configured to receive the information that is delivered by the at least two eNBs 901 at the same moment and is scrambled by using the same scrambling code, and combine and decode the received scrambled information by using a prestored scrambling code used by the at least two eNBs 901.

Figure 10:
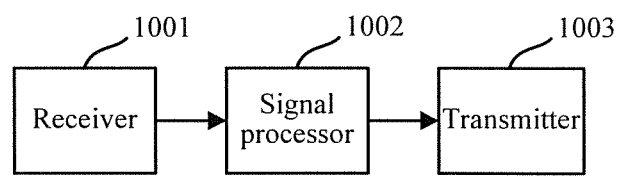
FIG. 10 is a schematic structural diagram of a base station according to an embodiment of the present invention.

FIG. 10 is a schematic structural diagram of a base station according to an embodiment of the present invention. The base station specifically includes:

a receiver 1001, configured to acquire information to be delivered to user equipment UE;

a signal processor 1002, coupled to the receiver 1001 and a transmitter 1003 and configured to scramble, by using an agreed scrambling code, the information that is to be delivered to the UE and is acquired by the receiver 1001, where the agreed scrambling code is the same as a scrambling code that is used by another base station eNB to scramble the information to be delivered to the UE; and the transmitter 1003, configured to deliver, to the UE at an agreed moment, the information scrambled by the signal processor 1002, where the agreed moment is the same as a moment for delivering scrambled information to the UE by another eNB.

Figure 11:
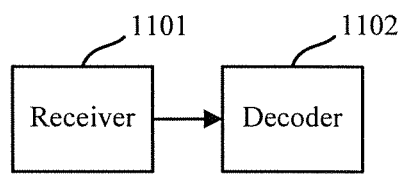
FIG. 11 is a schematic structural diagram of user equipment according to an embodiment of the present invention.

FIG. 11 is a schematic structural diagram of user equipment according to an embodiment of the present invention. The user equipment specifically includes:

a receiver 1101, configured to receive information that is delivered by at least two base stations eNBs at a same moment and is scrambled by using a same scrambling code; and a decoder 1102, coupled to the receiver 1101 and configured to combine and decode, by using a prestored scrambling code used by the at least two eNBs, the scrambled information received by the receiver 1101.

Embodiments of the present invention provide information sending and receiving methods and apparatuses, and an information transmission system. The method includes: acquiring, by at least two eNBs, information to be delivered to UE; scrambling, by using a same scrambling code, the information to be delivered to the UE; and delivering scrambled information to the UE at a same moment. In the foregoing method, the at least two eNBs deliver, at the same moment, the information scrambled by using the same scrambling code to the UE, so that the UE can receive at least two pieces of information scrambled by using the same scrambling code; therefore, compared with a method in which UE can receive only one piece of scrambled information in the prior art, the foregoing method provided in the embodiments of the present invention can improve accuracy of receiving, by cell-edge UE, information sent by eNBs.

A person skilled in the art should understand that the embodiments of this application may be provided as a method, a system, or a computer program product. Therefore, this application may use a fault of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provides steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. In this way, this application is intended to cover these modifications and variations provided that such modifications and variations of the embodiments of this application fall within the scope defined by the claims of this application and their equivalent technologies.

What is claimed is:

1. An information sending method, comprising:
acquiring, by at least two base stations (eNBs), information to be delivered to user equipment (UE), wherein the information comprises paging messages;
receiving, by the at least two eNBs, configuration information sent by a network management entity, wherein the configuration information carries information about a first scrambling code and parameter information for determining a sending moment for sending the paging messages;
scrambling, by the at least two eNBs using the first scrambling code, the paging messages;
adding, by the at least two eNBs, physical resource information and modulation and coding scheme information to paging scheduling information, wherein the physical resource information and the modulation and coding scheme information are for sending scrambled paging messages;
scrambling the paging scheduling information using a preset radio network temporary identifier (RNTI);
delivering scrambled paging scheduling information to the UE; and
determining, by the at least two eNBs according to the parameter information carried in the configuration information, the sending moment for sending the scrambled paging messages, and delivering the scrambled paging messages to the UE at the determined sending moment,
wherein the scrambled paging scheduling information is for enabling the UE to decode the scrambled paging scheduling information using the RNTI, acquire the physical resource information and the modulation and coding scheme information, and receive the scrambled paging messages according to the acquired physical resource information and modulation and coding scheme information.

2. An information sending method comprising:
generating, by a source cell base station (eNB), handover preparation request information, and sending the handover preparation request information to a target cell eNB, wherein the handover preparation request information carries information about a scrambling code and information about a sending moment for sending handover commands to be delivered to a user equipment (UE);
after receiving the handover preparation request information, generating, by the target cell eNB, handover preparation acknowledgment information carrying a handover request, and returning the handover preparation acknowledgment information to the source cell eNB;

using, by the source cell eNB, the handover request carried in the received handover preparation acknowledgment information as acquired information to be delivered to the UE;

scrambling, by the source cell eNB and the target cell eNB, the handover commands using the scrambling code carried in the handover preparation request information; and delivering, by the source cell eNB and the target cell eNB to the UE, scrambled handover commands at the sending moment carried in the handover preparation request information.

3. The method according to claim 2, wherein before generating, by a source cell eNB, handover preparation request information, the method further comprises:

delivering, by the source cell eNB, the information about the scrambling code to the UE for storage.

4. The method according to claim 2, wherein before delivering, by the source cell eNB and the target cell eNB to the UE, scrambled handover commands at the sending moment, the method further comprises:

adding, by the source cell eNB and the target cell eNB, physical resource information and modulation and coding scheme information to handover scheduling information, wherein the physical resource information and modulation and the coding scheme information are for sending the scrambled handover commands;

scrambling the handover scheduling information using a preset radio network temporary identifier (RNTI); and delivering scrambled handover scheduling information to the UE, the scrambled handover scheduling information for enabling the UE to decode the scrambled handover scheduling information using the RNTI, acquire the physical resource information and the modulation and coding scheme information, and receive the scrambled handover commands according to the acquired physical resource information and modulation and coding scheme information.

5. An information receiving method, comprising:

receiving and storing, by a user equipment (UE), configuration information sent by a network management entity, wherein the configuration information carries information about a first scrambling code and parameter information;

determining, by the UE according to the parameter information carried in the configuration information, a receiving moment for receiving paging messages;

receiving, by the UE, scrambled paging scheduling information that is sent by at least two base stations (eNBs) and is scrambled by using a preset radio network temporary identifier (RNTI), and decoding the scrambled paging scheduling information by using the RNTI, and acquiring physical resource information and modulation and coding scheme information that are carried in decoded paging scheduling information;

receiving, by the UE on a corresponding physical resource at the determined receiving moment according to the acquired physical resource information, scrambled paging messages that are delivered by the at least two eNBs at a same moment and are scrambled using a same scrambling code and demodulating the scrambled paging messages according to the acquired modulation and coding scheme information; and combining and decoding, by the UE, the received scrambled paging messages using the first scrambling code.

6. An information receiving method, comprising:

receiving and storing, by a user equipment (UE), information that is about a scrambling code and sent by a source cell base station (eNB);

receiving, by the UE, scrambled handover commands that are delivered by the source cell eNB and a target cell eNB at a same moment and are scrambled using the scrambling code, wherein a cell currently serving the UE is a source cell, and a cell to which the UE is to be handed over is a target cell; and combining and decoding, by the UE, the received scrambled handover commands using the scrambling code.

7. The method according to claim 6, wherein:

before receiving, by the UE, handover commands that are delivered by the source cell eNB and a target cell eNB at the same moment and are scrambled using the scrambling code, the method further comprises:

receiving, by the UE, scrambled handover scheduling information that is sent by the source cell eNB and the target cell eNB and is scrambled using a preset radio network temporary identifier (RNTI), and decoding the scrambled handover scheduling information using the RNTI, and acquiring physical resource information and modulation and coding scheme information that are carried in decoded handover scheduling information; and receiving, by the UE, handover commands that are delivered by the source cell eNB and a target cell eNB at the same moment and are scrambled using the scrambling code comprises:

receiving, by the UE on a corresponding physical resource according to the acquired physical resource information, the handover commands that are delivered by the source cell eNB and the target cell eNB at the same moment and are scrambled using the scrambling code, and demodulating the received scrambled handover commands according to the acquired modulation and coding scheme information.

8. An information sending apparatus, comprising:

a receiver configured to:

acquire information to be delivered to user equipment (UE), wherein the information comprises a paging message;

receive configuration information sent by a network management entity, wherein the configuration information carries information about a first scrambling code and parameter information for determining a sending moment for sending the paging message;

a processor configured to:

scramble, using the first scrambling code, the paging message, wherein the first scrambling code is the same as a scrambling code that is used by another base station (eNB) to scramble the information to be delivered to the UE;

add, to paging scheduling information, physical resource information and modulation and coding scheme information that are for sending a scrambled paging message; and scramble the paging scheduling information using a preset first radio network temporary identifier (RNTI); and a transmitter configured to deliver paging scheduling information to the UE;

wherein the processor is further configured to determine, according to the parameter information carried in the configuration information, the sending moment for sending the scrambled paging message;

wherein the transmitter is further configured to deliver the scrambled paging message to the UE at the determined sending moment, wherein the determined sending moment is the same as a moment for delivering scrambled information to the UE by the other eNB, wherein the scrambled paging scheduling information is for enabling the UE to decode the scrambled paging scheduling information using the RNTI, acquire the physical resource information and the modulation and coding scheme information, and receive the scrambled paging messages according to the acquired physical resource information and modulation and coding scheme information.

9. An information sending apparatus, comprising:
a receiver configured to:
  generate handover preparation request information, and send the handover preparation request information to a target cell eNB, wherein the handover preparation request information carries information about a scrambling code and information about a sending moment for sending a handover command to be delivered to a user equipment (UE); and
  receive handover preparation acknowledgment information that is returned by the target cell eNB and carries a handover request, and
a processor configured to:
  use the handover request carried in the received handover preparation acknowledgment information as acquired information to be delivered to the UE; and
  scramble the handover command using the scrambling code carried in the handover preparation request information; and
a transmitter configured to deliver a scrambled handover command to the UE at the sending moment carried in the handover preparation request information.

10. The apparatus according to claim 9, wherein the transmitter is further configured to: before the processor acquires the information to be delivered to the UE, send the information about the scrambling code to the UE for storage.

11. The apparatus according to claim 9, wherein:
the processor is further configured to:
  before the transmitter delivers the scrambled handover command to the UE, add, to handover scheduling information, physical resource information and modulation and coding scheme information that are for sending the scrambled handover command; and
  scramble, using a preset radio network temporary identifier (RNTI), the handover scheduling information; and
the transmitter is further configured to deliver scrambled handover scheduling information to the UE, the scrambled handover scheduling information for enabling the UE to decode the scrambled handover scheduling information using the RNTI, acquire the physical resource information and the modulation and coding scheme information, and receive the scrambled handover command according to the acquired physical resource information and modulation and coding scheme information.

12. An information receiving apparatus, comprising:
a receiver configured to receive and store configuration information sent by a network management entity, wherein the configuration information carries information about a first scrambling code and parameter information; and
a processor configured to determine, according to the parameter information, a receiving moment for receiving paging messages;
wherein the receiver is further configured to:
  receive scrambled paging scheduling information that is sent by at least two base stations (eNBs) and is scrambled by using a preset radio network temporary identifier (RNTI);
  decode the scrambled paging scheduling information by using the RNTI, and acquire physical resource information and modulation and coding scheme information that are carried in decoded paging scheduling information;
  receive, on a corresponding physical resource at the determined receiving moment according to the acquired physical resource information, scrambled paging messages that are delivered by the at least two eNBs at a same moment and are scrambled using a same scrambling code; and
  demodulate the scrambled paging messages according to the acquired modulation and coding scheme information; and
wherein the processor is further configured to combine and decode, using the first scrambling code used by the at least two eNBs, the scrambled paging messages.

13. An information receiving apparatus comprising:
a receiver configured to:
  receive and store information that is about a scrambling code and sent by a source cell base station (eNB);
  receive scrambled handover commands that are delivered by the source cell eNB and a target cell eNB at a same moment and are scrambled using the scrambling code, wherein a cell currently serving the UE is a source cell, and a cell to which the UE is to be handed over is a target cell; and
a processor configured to combine and decode, using the scrambling code, the scrambled handover commands.

14. The apparatus according to claim 13, wherein:
the receiver is further configured to: before receiving the handover commands that are delivered by the source cell eNB and the target cell eNB at the same moment and are scrambled using the scrambling code, receive scrambled handover scheduling information that is sent by the source cell eNB and the target cell eNB and is scrambled using a preset radio network temporary identifier (RNTI);
the processor is further configured to decode, using the RNTI, the scrambled handover scheduling information, and acquire physical resource information and modulation and coding scheme information that are carried in decoded handover scheduling information; and
the receiver is further configured to receive, on a corresponding physical resource according to the physical resource information, the handover commands that are delivered by the source cell eNB and the target cell eNB at the same moment and are scrambled using the scrambling code, and demodulate the received scrambled handover commands according to the modulation and coding scheme information.

* * * * *